(12) United States Patent
Zhu et al.

(10) Patent No.: US 8,908,637 B2
(45) Date of Patent: Dec. 9, 2014

(54) METHOD AND APPARATUS FOR DISCOVERING A HOME LINK IN MOBILE IP

(75) Inventors: Chunhui Zhu, Guangdong Province (CN); Zaifeng Zong, Guangdong Province (CN); Jinguo Zhu, Guangdong Province (CN)

(73) Assignee: ZTE Corporation (CN)

( * ) Notice: Subject to any disclaimer, the term of this patent is extended or adjusted under 35 U.S.C. 154(b) by 350 days.

(21) Appl. No.: 12/848,515

(22) Filed: Aug. 2, 2010

(65) Prior Publication Data

US 2011/0009160 A1 Jan. 13, 2011

Related U.S. Application Data

(63) Continuation-in-part of application No. PCT/CN2008/072826, filed on Oct. 24, 2008.

(30) Foreign Application Priority Data

Feb. 2, 2008 (CN) .......................... 2008 1 0007085

(51) Int. Cl.
*H04W 4/00* (2009.01)
*H04W 8/26* (2009.01)
*H04L 12/28* (2006.01)
*H04L 12/56* (2006.01)
*H04W 76/02* (2009.01)
*H04W 84/12* (2009.01)

(52) U.S. Cl.
CPC .............. *H04W 8/26* (2013.01); *H04W 76/021* (2013.01); *H04E 80/04* (2013.01); *H04W 84/12* (2013.01)
USPC ........................... 370/331; 370/338; 370/392

(58) Field of Classification Search
None
See application file for complete search history.

(56) References Cited

U.S. PATENT DOCUMENTS

| 2004/0176095 | A1 | 9/2004 | Yamada et al. |
| 2005/0277418 | A1 * | 12/2005 | Singhal et al. ................. 455/439 |
| 2006/0077932 | A1 | 4/2006 | Takeda et al. |
| 2006/0270446 | A1 * | 11/2006 | Ikeda ......................... 455/552.1 |
| 2007/0070946 | A1 | 3/2007 | Dorenbosch et al. |

(Continued)

FOREIGN PATENT DOCUMENTS

| CN | 1561053 A | 1/2005 |
| CN | 1620176 | 5/2005 |
| CN | 1697548 | 11/2005 |
| EP | 1764970 A1 | 3/2007 |

OTHER PUBLICATIONS

International Search Report for corresponding application PCT/CN2008/072826 mailed on Feb. 5, 2009.

*Primary Examiner* — Xavier Szewai Wong
(74) *Attorney, Agent, or Firm* — Banner & Witcoff, Ltd.

(57) ABSTRACT

The present invention provides a method and apparatus for discovering a home link in mobile IP, wherein the method includes: an access network assigns an address for a UE when the UE is attached to the network; the UE acquires a home address from the network; the UE compares the address assigned by the access network with the home address, and confirms that the UE is attached to the home link in the case that the address assigned by the access network and the home address are the same. Therefore, with the present invention, it is not necessary to configure the UE in advance, and the participation of the user is also not required. Thus improved application flexibility is provided.

5 Claims, 5 Drawing Sheets

(56) References Cited

U.S. PATENT DOCUMENTS

| | | | |
|---|---|---|---|
| 2007/0268919 A1* | 11/2007 | Sarikaya et al. | 370/401 |
| 2008/0279151 A1* | 11/2008 | Patil et al. | 370/331 |
| 2010/0238811 A1* | 9/2010 | Rune | 370/248 |
| 2013/0242917 A1* | 9/2013 | Aso et al. | 370/329 |

* cited by examiner

METHOD AND APPARATUS FOR DISCOVERING A HOME LINK IN MOBILE IP

CROSS-REFERENCE TO RELATED APPLICATIONS

The present application is a Continuation-in-Part of International Application PCT/CN2008/072826 filed Oct. 24, 2008, which claims the benefits of Chinese Patent Application No. 200810007085.0 filed Feb. 2, 2008.

FIELD OF THE INVENTION

The present invention relates to communication field, in particular to a method and apparatus for discovering a home link in mobile IP.

BACKGROUND OF THE INVENTION

The I-WLAN (Interworking Wireless Local Area Network) is a WLAN network interacting with the 3GPP (the $3^{rd}$ Generation Partnership Project) network. The I-WLAN mainly comprises a WAN (WLAN Access Network), a WAG (WLAN Access Gateway), a PDG (Packet Data Gateway) and other supporting nodes. The purpose for interacting is to enable the cooperation between the WLAN access technology and the facilities of the 3GPP core network, so that the WLAN subscriber can access the 3GPP packet service through the WLAN access network.

The GPRS (General Packet Radio Service) access network comprises a 3GPP wireless access network (GSM EDGE Radio Access Network/UMTS Terrestrial Radio Access Network, GERAN/UTRAN for short), an SGSN (Serving GPRS Support Node), a GGSN (Gateway GPRS Support Node) and other support nodes.

A mobile subscriber having the access capability for the I-WLAN and GPRS Access Network requires to keep service continuity when switching between the two access networks. The 3GPP Standard Organization has determined to employ DSMIPv6 (Dual-Stack Mobile Internet Protocol version 6) as the solution to keep service continuity. The solution enables the mobile subscriber to keep IP address unchanged after the mobile subscriber switches between the I-WLAN and GPRS Access Network, so as to realize the continuity of the service.

FIG. 1 is the architecture diagram of the mobility solution (I-WLAN Mobility) between the I-WLAN network and 3GPP Network.

As shown in FIG. 1, a UE (User Equipment) can access the I-WLAN network and 3GPP network. Both the GGSN and PDG can be considered to be ARs (Access Routers). An HA (Home Agent) and corresponding 3 interfaces, i.e., H1 (between the HA and UE), H2 (between the HA and 3GPP AAA Server), and H3 (between the HA and AR) are added between the above mentioned I-WLAN network and 3GPP network.

3GPP EPS (Evolved Packet System) is consisted of an evolved UTRAN (Evolved Universal Terrestrial Radio Access Network, E-UTRAN for short), an S-GW (Serving Gateway), a PDN GW (Packet Data Network Gateway, PDN GW or P-GW for short) and other supporting nodes. The S-GW is an access gateway device connected to the E-UTRAN, which forwards data between the E-UTRAN and PDN GW, and is in charge of buffering the paging waiting data; the P-GW is a border gateway between the EPS and the PDN (Packet Data Network) network, and is in charge of the functions, such as the accessing of the PDN and the data forwarding between the EPS and the PDN.

FIG. 2 is the architecture diagram for a non-3GPP network accessing the EPS network.

As shown in FIG. 2, the EPS supports the interaction with a non-3GPP network. The P-GW functions as an anchor during the switch between the 3GPP network and the non-3GPP network. The subscriber uses an S2c interface when accessing the EPS network using the terminal-based mobile IP protocol, wherein the S2c interface is an interface between the UE and the P-GW.

The mobile IP protocol is a network layer scheme for providing mobile function on Internet, so that the node can not interrupt the ongoing communication when switching a link Especially, the mobile IP provides an IP routing mechanism, which enables the mobile node to be visited through its home address when it accesses a foreign link.

Some important special terms related to the mobile IP will be explained hereafter.

Mobile node is a node in the mobile IP which can move from one connection point to another connection point of a link and still can be visited through its home address.

Home agent is a router in the home link of the mobile node. When the mobile node leaves the home link, it can intercept, on its home link, the data package whose destination address is the home address of the mobile node, and forward the data package to the care of address registered by the mobile node via a tunnel.

Home Address (HoA for short) refers to a permanent IP address assigned to the mobile node and belongs to the home link of the mobile node. A standard IP routing mechanism can transmit the packet to be sent to the home address of the mobile node to another home link. The Home Network Prefix is (HNP for short) is the prefix of the IPv6 home address. In present Specification, the HoA allocated by the HA can be the HNP.

Care of Address (CoA for short) refers to an IP address acquired by the mobile node at the time of visiting a foreign link. The sub-network prefix of such an IP address is a foreign sub-network prefix.

Home Link is a network corresponding to the home sub-network prefix of the mobile node.

Foreign Link is any link other than the home link.

Binding refers to the correlation between the care of address and the home address of the mobile node.

When a UE, as a mobile node, accesses the I-WLAN Mobility system or EPS network, the mobile IP protocol (DSMIPv6) is used to keep the IP address of the subscriber unchanged, so as to maintain the continuity of the subscriber service When the UE accesses the I-WLAN Mobility system and EPS network, the network is composed of an access router (AR) and a home agent (HA). The GGSN, PDG and P-GW, as the access routers of the subscriber, assign an access network address to the UE, wherein the address is used as the CoA when the UE uses mobile service, When the UE uses mobile service, the UE initiates IKEv2 (Internet Key Exchange version 2) to establish security association with the HA, and during the IKEv2, the HA will assign an IP address (HoA) for the UE and send this address to the UE.

The UE does not utilize the mobile IP protocol when accessing the Home Link, and does not bind the HoA and the CoA at the HA. The I-WLAN Mobility system can configure the GPRS or I-WLAN as the home link of the UE; the home link of the UE can be configured as the EPS access network (E-UTRAN) in the EPS network. When the UE accesses the home link configured above, there are three methods to enable the UE to discover whether the current access link is the home link in the prior art.

Method 1, information, such as home agent address, home address of the UE is statically configured in the UE, the UE detects the router broadcast on the current IP link, if a link address prefix in the broadcast content is consistent with a prefix of its home address, then it is considered that the home link is accessed;

Method 2, the UE link layer detects the current access technology, and determines whether the current access network is the home link according to the previously configured information and informs the IP layer;

Method 3, when the UE receives the current access information, the subscriber selects whether the current access link is the home link.

Method 1 and Method 2 require to configure corresponding information in the UE and thus reduces the flexibility of the use; Method 3 requires the participation of the subscriber and thus increases the complexity and affects subscriber experience.

SUMMARY OF THE INVENTION

The present invention is directed to provide to a method and apparatus for discovering a home link in mobile IP, so as to solve the problem of inflexibility or complication caused by the method for the UE discovering the home link in the prior art.

According to one aspect of the present invention, there is provided a method for discovering a home link in mobile IP.

The method for discovering a home link in mobile IP according to the present invention comprises: when a UE is attached to the network, an access network assigning an address to the UE; the UE obtaining a home address from the network; the UE comparing the address assigned by the access network with the home address, and determining that the UE is attached to the home link in the case that the address assigned by the access network is the same as the home address.

The method for discovering a home link in mobile IP according to the present invention further comprises: when the UE returns to the home link, in the case that the prefix information of a route notice message broadcasted on the home link is the same as the prefix information of the home address of the UE, the UE considering that it returns to the home link and sending a binding update message to the home agent; after receiving the binding update message, the home agent dismissing the binding relationship in the home agent between the address assigned by the access network and the home address.

Wherein, during the UE obtains the home address from the network, the home address is sent to the UE by the access network or the home agent.

Wherein, the access network and the home agent share a same address space and use same identity information to identify the UE.

In the case that any one of access network and the home agent assigns an address to the UE, the method further comprises the following process: inquiring whether the UE has been assigned with an address according to the identity information of the UE; in the case that it is inquired the address has been assigned, the UE is assigned with the same address as the address that has been assigned.

After the access network assigns an address to the UE, the method further comprises the following process: the access network registering, in an address assignment table, the identity information of the UE, the address assigned to the UE and the association relationship between the identity information and the assigned address.

The above method further comprises following process: the home agent searching the address assigned to the UE in the address assignment table through the association relationship between the identity information of the UE and the assigned address; if an address corresponding to the identity information is searched out, the home agent regards the searched address as a home address.

Preferably, the above access network comprises an access router.

According to the present invention, the function of the access the router and the function of the home agent can be set in one device.

According to another aspect of the present invention, there is also provided an apparatus for discovering a home link in mobile IP.

The apparatus for discovering a home link in MIP according to the present invention comprises, a first address assigning module, which is used to assign an IPv6 prefix associated with a specific access system of a UE to the UE; a second address assigning module, which is used to assign a Home Network Prefix (HNP) associated with a PDN connection to the UE; a comparing module, which is used to compare the two prefixes, and if the two prefixes match with each other, determine that the UE is on the home link.

Therefore, through employing the above technology scheme of the present invention, it is determined whether the UE is attached to the home link by comparing the home address assigned to the UE and the care of address, without pre-configuring the UE and the participation of the subscriber, thus a better application flexibility is obtained.

Other features and advantages of the present invention will be detailed in the description, and partly obvious from the description, or can be understood through implementing the present invention. The purposes and other advantages can be achieved and obtained through the structure specified by the specification, claims and drawings.

BRIEF DESCRIPTION OF THE DRAWINGS

Drawings are provided for the further understanding of the present invention and form a part of the specification, which are used to explain the present invention with embodiments of the present invention rather than limit the present invention, wherein.

DETAILED DESCRIPTION OF THE EMBODIMENTS

The preferred embodiment of the present invention will be described in connection with drawings. It should be understood that the preferred embodiment described herein is only intended to illustrate and explain the present invention rather than limit present invention.

Method Embodiments

According to the embodiment of the present invention, there is provided a method for discovering a home link in mobile IP.

Figure 1:
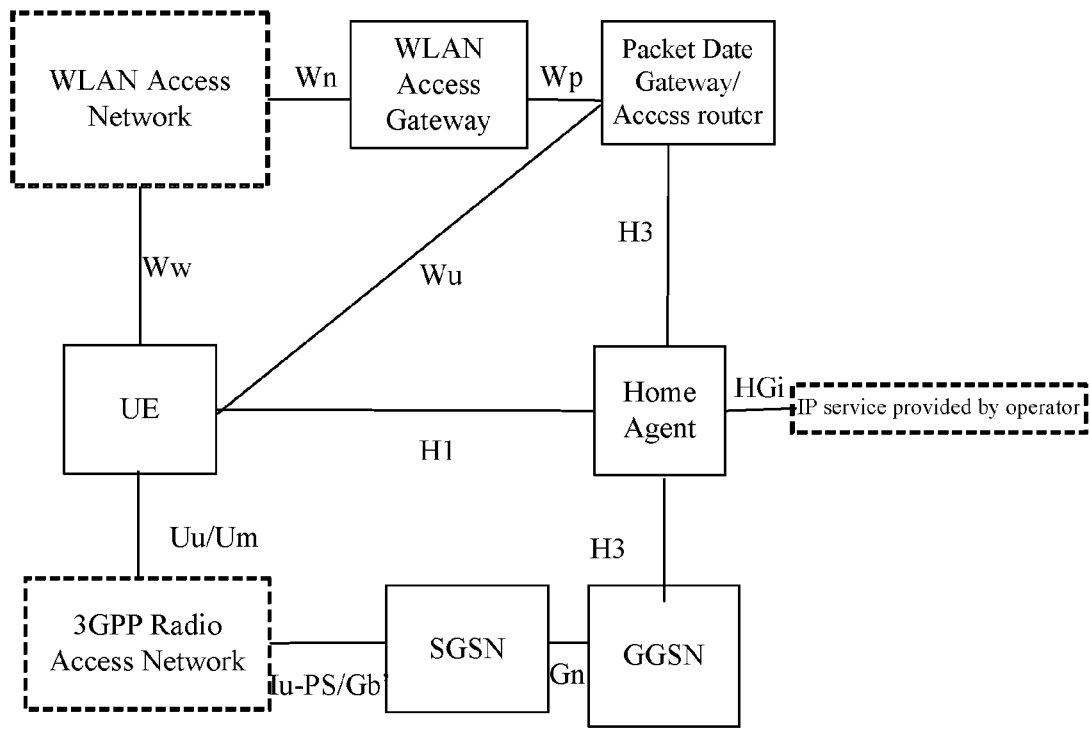
FIG. 1 is the architecture diagram of the mobility solution (I-WLAN Mobility) between I-WLAN network and 3GPP network according to the related art.
Figure 2:
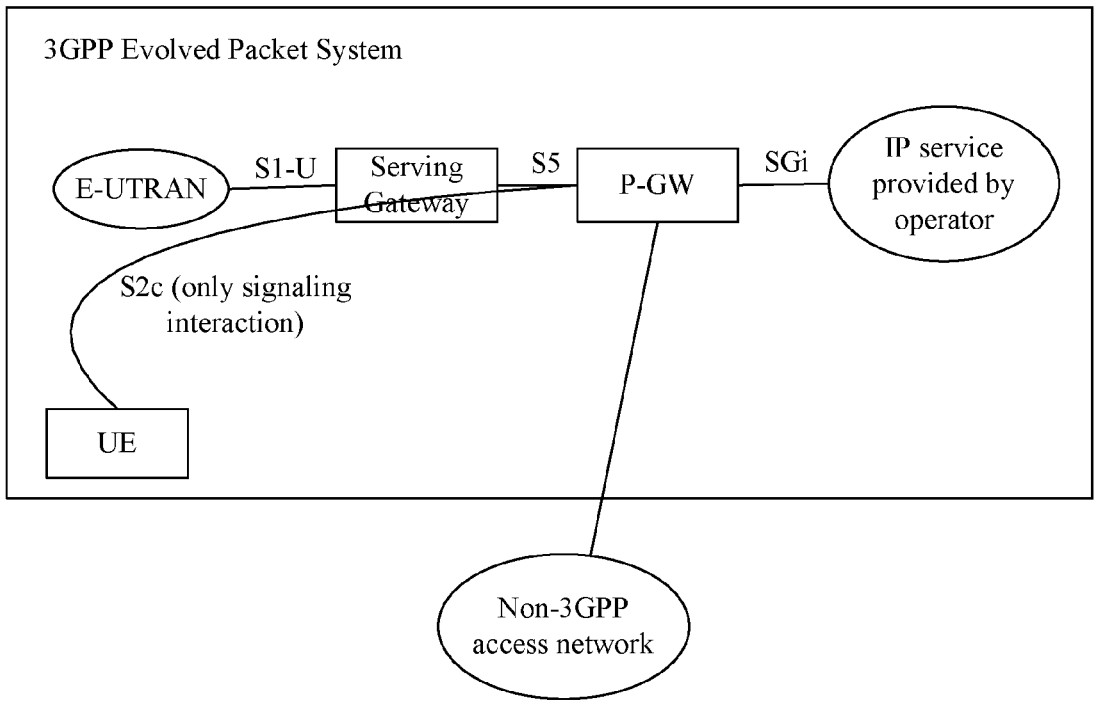
FIG. 2 is the architecture diagram for non-3GPP network accessing the EPS network according to the related art.
Figure 3:
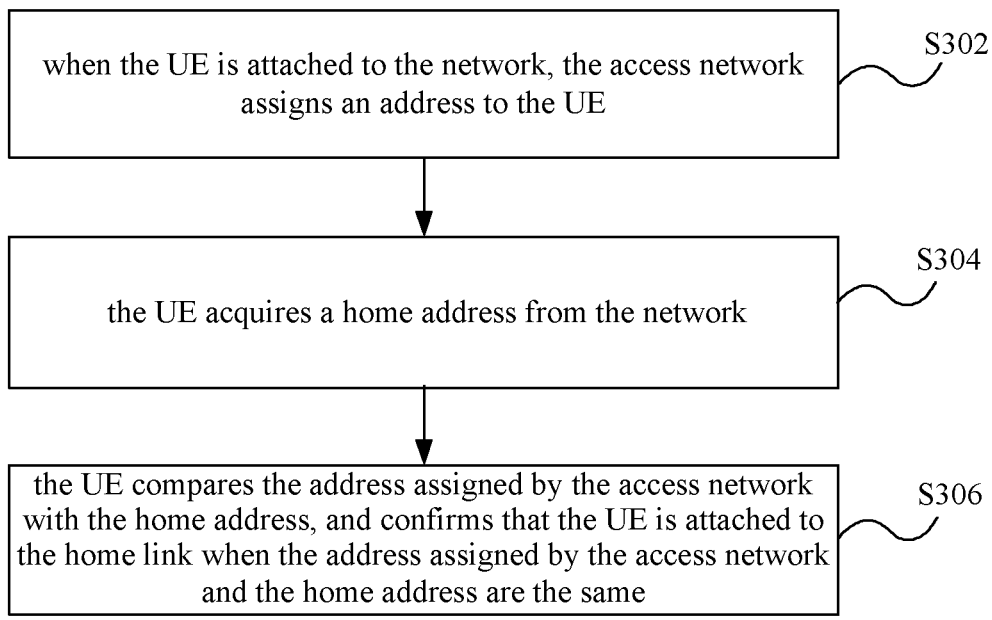
FIG. 3 is the flow chart of the method for discovering a home link in mobile IP according to the embodiment of the present invention.

FIG. 3 is the flow chart of the method for discovering a home link in mobile IP according to the present invention, as shown in FIG. 3, the method comprises:

S302, when the UE is attached to a network, the access network assigns an address to the UE, preferably, the address can be an IPv6 prefix associated with a specific access system of the UE;

S304, the UE acquires a home address from the network, preferably, the home address can be a HNP (Home Network Prefix) associated with a PDN (Packet Data Network) connection;

S306, the UE compares the address assigned by the access network with the home address, and confirms that the UE is attached to the home link when the address assigned by the access network and the home address are the same.

Preferably, based on the above process, the method for discovering a home link in mobile IP according to the present invention further comprises the following processes: when the UE returns to a home link, the UE determines whether the prefix of a route notice message broadcasted on the home link is the same as the prefix of the home address of the UE; if the result of the determination is that they are the same, the UE considers that it returns to the home link and sends a binding update message to a home agent; after receiving the binding update message, the home agent dismisses the binding relationship in the home agent between the address assigned by the access network and the home address. Wherein, during the binding process, the address assigned by the access network and the home address are set to be the same.

Wherein, during the process of the UE acquiring the home address from the network, the home address is sent to the UE by the access network or the home agent.

Wherein, the access network and the home agent share the same address space, and use the same identity information to identify the UE, the identity information of the UE can be the IMSI (International Mobile Subscriber Identity).

Preferably, when any one of the access network and the home agent assigns an address to the UE, the above method further comprises the following processes: inquiring whether the UE has been assigned with an address according to identity information of the UE; in the case that the inquired result is the address has been assigned, the UE is assigned with the same address as the address that has been assigned.

After the access network assigns an address to the UE, the method further comprises the following process: the access network registers, in an address assignment table, the identity information of the UE, the address assigned to the UE and the association relationship between the identity information and the assigned address.

Moreover, the process of establishing security association comprises the following processes: the home agent searches the address assigned to the UE in the address assignment table through the association relationship between the identity information of the UE and the assigned address; and if the address corresponding to the identity information is searched out, the home agent regards the searched address as a home address.

In a particular implementation process, the above network comprises an access network and a home agent, and the access network comprises an access router, and the function of the access router may be implemented by various network elements according to the type of the network to which the UE is attached; in particular, when the attached network is a general packet wireless service network, the access router is a GGSN; when the attached network is an interactive wireless local area network, the access router is a PDG; when the attached network is an evolved packet system network, the access router is a P-GW. Moreover, the function of the access router and the function of the home agent can be realized in the same device.

Hereinafter, the discovering method will be described according to the different situations of UE attachment.

when a UE is attached to the network at the first time, the UE acquires an IP address from the network, and regards the IP address as the CoA, which may preferably be an IPv6 prefix associated with the specific access system of the UE; after the UE acquires an address of the HA, the UE establishes a security association with the HA, wherein the HA assigns an HoA (or a prefix) to the UE, which can preferably be a HNP (Home Network Prefix) associated with a PDN (Packet Data Network) connection, and the UE compares the CoA with the HoA; if the CoA is the same as the HoA (or the prefixes), then the UE considers itself as staying at the home link, at this time, the UE does not need to send a binding update message of mobile IPv6 to the HA, and the mobile IPv6 protocol is not started. During the above process, the HA has to inquire the CoA assigned to the UE, and assigns the CoA as a HoA to the UE. One feasible way is that the HA and the AR assigning the CoA are set in one module and share the same IP address space, and the same identity information (which can be the IMSI of the UE) is used in the HA and the AR to identify the UE, when the HA assigns the HoA to the UE, the HA first inquires whether the UE has been assigned with an IP address (i.e., CoA) according to the identity information of the UE, if it has been assigned, the same IP address is returned to the UE.

when the UE switches from a foreign link to the home link, the AR of the home link inquires whether the UE has been assigned with an IP address (i.e., HoA) according to the identity information of the UE when the AR of the home link assigns a CoA to the UE; if it has been assigned, the AR generates a route notice according to the prefix of the above IP address, and sends it to the UE. After receiving the route notice, the UE judges that the prefix of the IP address in the route notice and the prefix of the HoA are the same, and considers itself to be back to the home link. The UE sends a de-binding update message to the HA, wherein the CoA and the HoA are the same, so as to dismiss the binding relationship of the UE in the HA. The above process requires that the AR should be able to inquire, according to the identity information of the UE, the HoA assigned by the HA to the UE, one feasible method is to set the HA and the AR in one module, and use the same identity information in the HA and the AR to identify the UE.

In above process, when the UE is attached to the home link, the access router (AR) assigning the CoA to the UE and the home agent (HA) assigning the HoA to the UE need to share the same address space and use the same identity information to identify the UE. When one of them (HA or AR) assigns an IP address to the UE, it always inquires whether an IP address has been assigned to the UE according to the identity information of the UE, if it has been assigned, the apparatus assigns the same IP address to the UE. One feasible realization way is to set the AR and the HA in one module, and the two logic apparatuses share an address assignment table.

Embodiments 1, 2, and 3 below describe the situations that the UE is attached to the home link.

Figure 4:
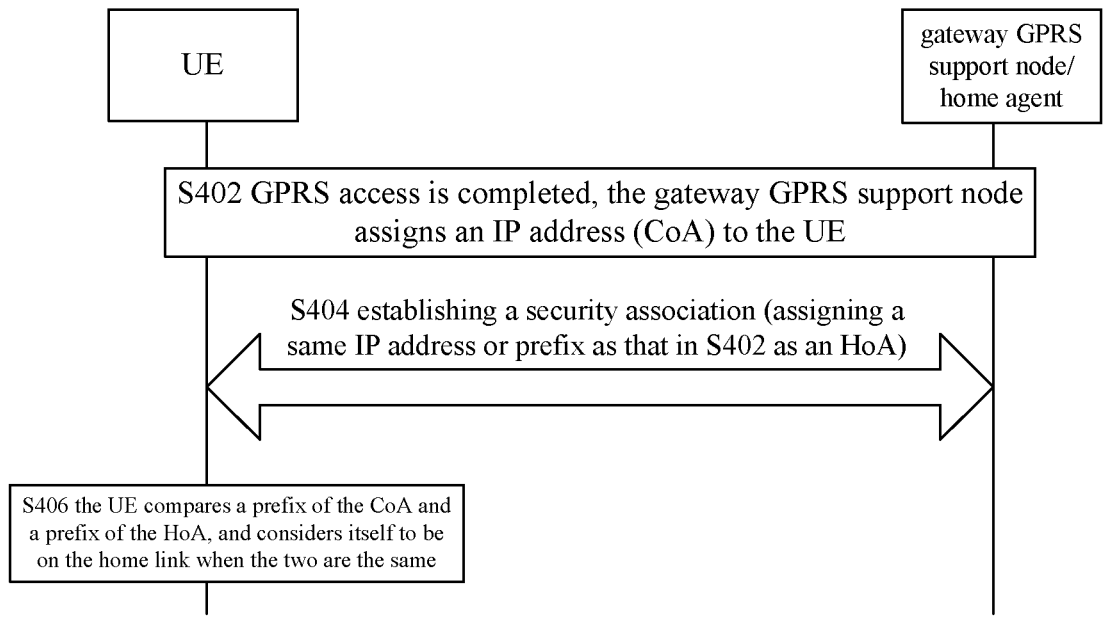
FIG. 4 is the flow chart showing the first embodiment according to the present invention.

FIG. 4 is the flow chart showing the first embodiment according to the present invention.

As shown in FIG. 4, the present embodiment illustrates that the UE accesses the GPRS network, wherein the GPRS network is the home link of the UE, the GGSN (AR) and the HA are set in one module, and the steps are described as follows:

S402, the UE accesses the GPRS network, the GGSN (AR) assigns an IP address (CoA) to the UE, and registers, in the address assignment table, the association relationship between the identity information of the UE and the IP address (or the prefix) assigned to the UE, the identity information of the UE may be the IMSI of the UE; the AR function module and the HA function module share the address assignment table; alternatively, the GGSN may also assign an HoA to the UE and send it to the UE, in this case Step S404 will be omitted and Step S406 will be carried out directly. Preferably, the CoA can be an IPv6 prefix associated with GPRS (the specific access system) of the UE;

S404, the UE establishes a security association with the HA function module, during the process of establishing the security association, the HA function module searches, in the above address assignment table, the IP address (or the prefix) assigned to the UE by the GGSN (AR) according to the identity information of the UE; if a corresponding item is found out, the HA takes the IP address (or a prefix) corresponding to the item as the HoA and sends it to the UE during the process of establishing the security association; and S406, the UE compares the prefix of the HoA and the prefix of the CoA, if they are the same, the UE is considered to be attached to the home link and does not start MIPv6 protocol stack.

Figure 5:
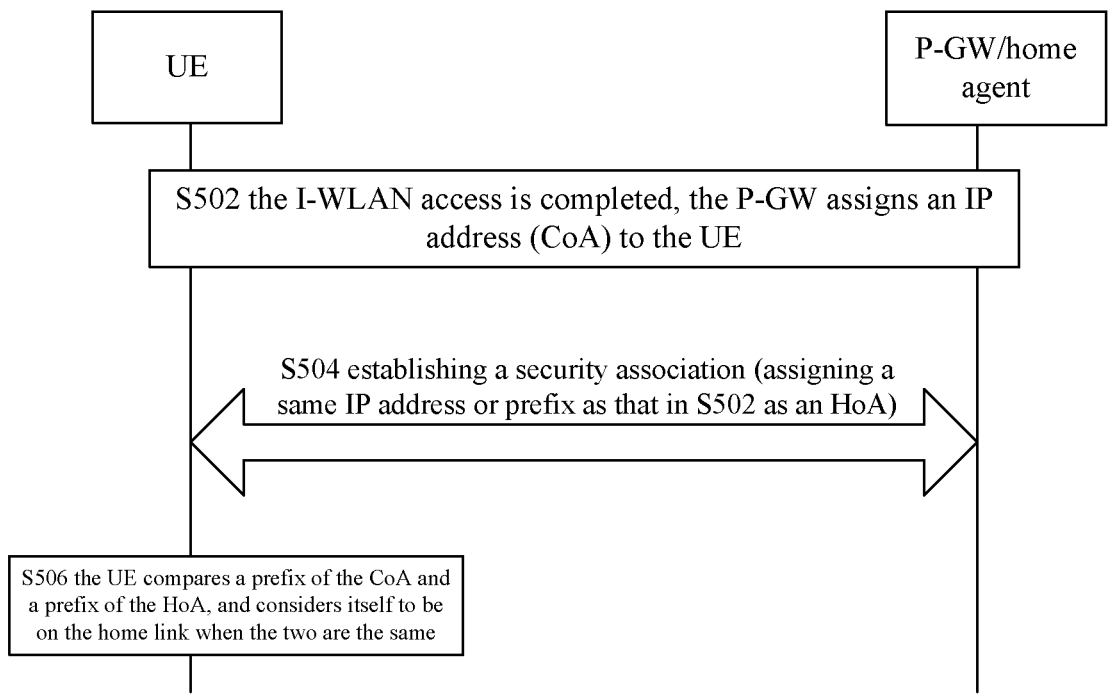
FIG. 5 is flow chart showing the second embodiment according to the present invention.

FIG. 5 is the flow chart showing the second embodiment of the present invention.

As shown in FIG. 5, the present embodiment illustrates that the UE accesses the I-WLAN network, wherein the I-WLAN network is the home link of the UE, the PDG (AR) and the HA are set in one module, and the steps are described as follows.

S502, the UE accesses the I-WLAN network, the PDG (AR) assigns an IP address (CoA) to the UE, and registers, in the address assignment table, the association relationship between the identity information of the UE and the IP address (or the prefix) assigned to the UE, the identity information of the UE may be the IMSI of the UE; the AR function module and the HA function module share the address assignment table; alternatively, the PDG may also assign an HoA to the UE and send it to the UE, in this case Step S504 will be omitted and the Step S506 will be carried out directly. Preferably, the CoA can be an IPv6 prefix associated with I-WLAN (the specific access system) of the UE;

S504, the UE initiates to establish a security association with the HA function module, during the process of establishing the security association, the HA function module searches, in the above address assignment table, the IP address (or the prefix) assigned to the UE by the PDG (AR) according to the identity information (IMSI) of the UE; if a corresponding item is found out, the HA takes the IP address (or a prefix) corresponding to the item as the HoA and sends it to the UE during the process of establishing the security association; and S506, the UE compares the prefix of the HoA and that the prefix of the CoA, if they are the same, the UE is considered to be attached to the home link and does not start MIPv6 protocol stack.

Figure 6:
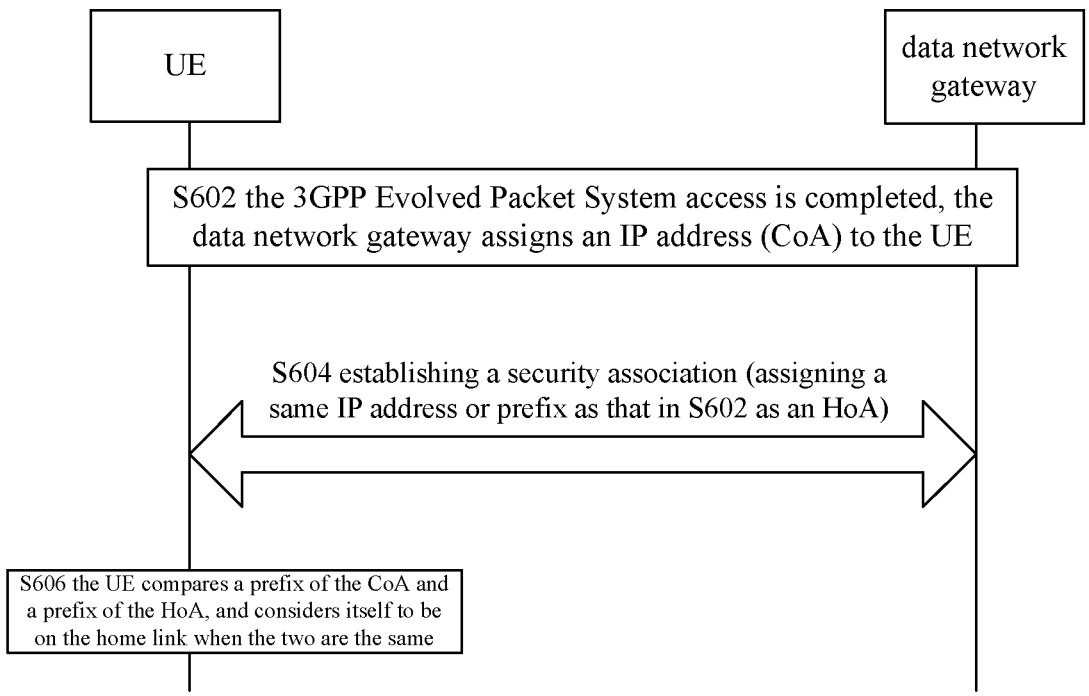
FIG. 6 is flow chart showing the third embodiment according to the present invention.

FIG. 6 is the flow chart showing the third embodiment of the present invention.

As shown in FIG. 6, the present embodiment illustrates that the UE accesses the EPS network, wherein the EPS network is the home link of the UE, the P-GW has the functions of the AR and the HA, and the steps are described as follows.

S602, the UE accesses the EPS network, the AR function module of the P-GW assigns an IP address (CoA) to the UE, and registers, in the address assignment table, the association relationship between the identity information of the UE and the IP address (or the prefix) assigned to the UE, the identity information of the UE may be the IMSI of the UE; the AR function module and the HA function module share the address assignment table; alternatively, the P-GW may also assign an HoA to the UE and send it to the UE, in this case Step S604 will be omitted and the Step S606 will be carried out directly. Preferably, the CoA can be an IPv6 prefix associated with EPS (the specific access system) of the UE;

S604, the UE establishes a security association with the HA function module, during the process of establishing the security association, the HA function module searches, in the above address assignment table, the IP address (or the prefix) assigned to the UE by the AR function module according to the identity information (IMSI) of the UE; if a corresponding item is found out, the HA takes the IP address (or the prefix) corresponding to the item as the HoA and sends it to the UE during the process of establishing the security association; and S606, the UE compares the prefix of the HoA and the prefix of the CoA, if they are the same, the UE is considered to be attached to the home link and does not start MIPv6 protocol stack.

Embodiments 4, 5, and 6 below describe the situations that the UE switches from a foreign link to a home link.

Figure 7:
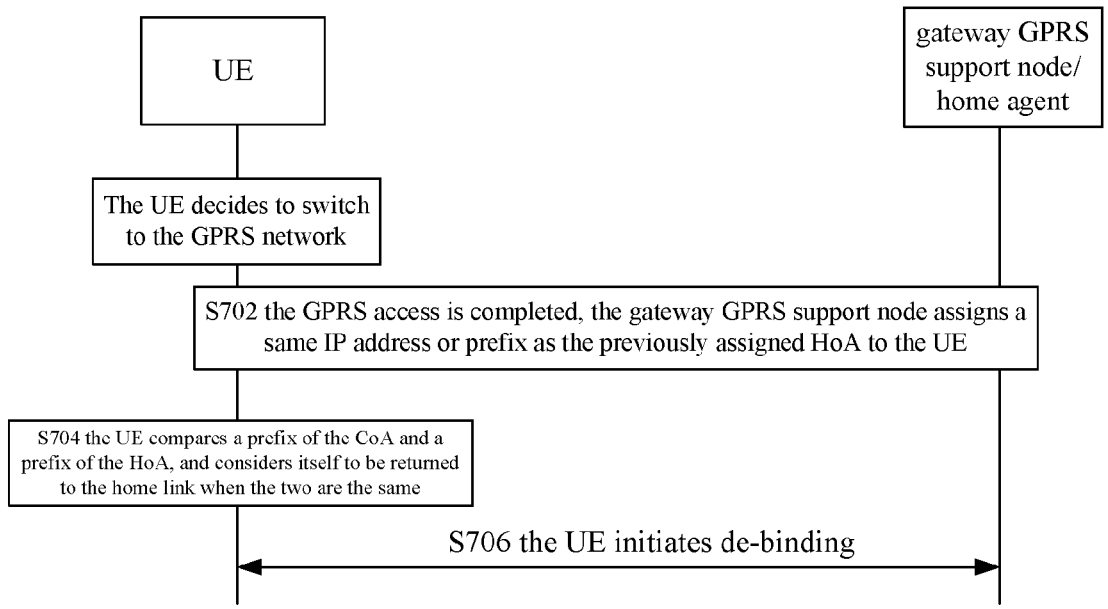
FIG. 7 is flow chart showing the fourth embodiment according to the present invention.

FIG. 7 is the flow chart showing the fourth embodiment of the present invention.

As shown in FIG. 7, the present embodiment illustrates that the UE switches from a foreign link to a GPRS network, wherein the GPRS network is the home link of the UE, the GGSN (AR) and the HA are set in one module, and the steps are described as follows.

S702, the UE accesses the GPRS network, the GGSN (AR) searches, in the address assignment table, the IP address (or the prefix) assigned to the UE by the HA function module according to the identity information (the IMSI) of the UE; if a corresponding item is found out, the GGSN (AR) sends an IP address (or a prefix) corresponding to the item to the UE as the CoA. Preferably, the CoA can be an IPv6 prefix associated with GPRS (the specific access system) of the UE;

S704, the UE compares the prefix of the HoA stored when the UE accessed the foreign link before the switch with the prefix of the IP address (CoA) obtained from the GGSN (AR), if they are the same, the UE is considered to be returned to the home link; and S706, the UE sends a de-binding update message to the HA, and after receiving the message, the HA dismisses the binding relationship between the HoA and the CoA of the UE.

Figure 8:
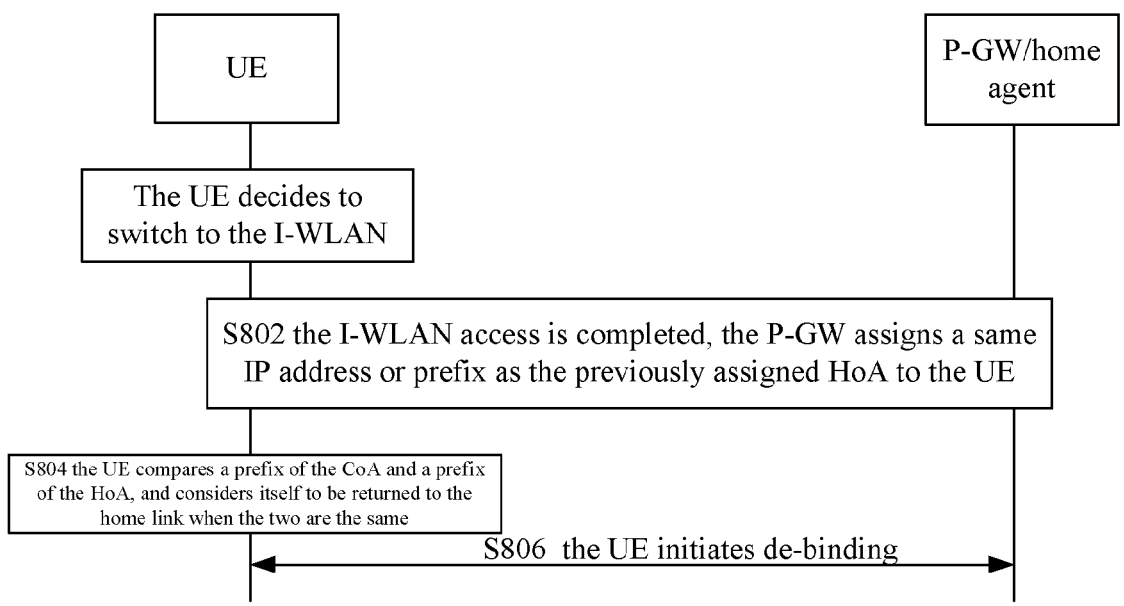
FIG. 8 is flow chart showing the fifth embodiment according to the present invention.

FIG. 8 is the flow chart showing the fifth embodiment of the present invention.

As shown in FIG. 8, the present embodiment illustrates that the UE switches from the foreign link to a I-WLAN network, wherein the I-WLAN network, is the home link of the UE, the PDG (AR) and the HA are set in one module, and the steps are described as follows:

S802, the UE accesses the I-WLAN network, the PDG (AR) searches, in the address assignment table, the IP address (or the prefix) assigned to the UE by the HA function module according to the identity information (IMSI) of the UE; if a corresponding item is found out, the PDG (AR) takes the IP address (or a prefix) corresponding to the item as the CoA and sends it to the UE;

S804, the UE compares the prefix of the HoA stored when the UE accessed the foreign link before the switch with the prefix of the IP address (CoA) obtained from the PDG (AR), if they are the same, the UE is considered to be returned to the home link; and S806, the UE sends a de-binding update message to the HA, and after receiving the message, the HA dismisses the binding relationship between the HoA and the CoA of the UE.

Figure 9:
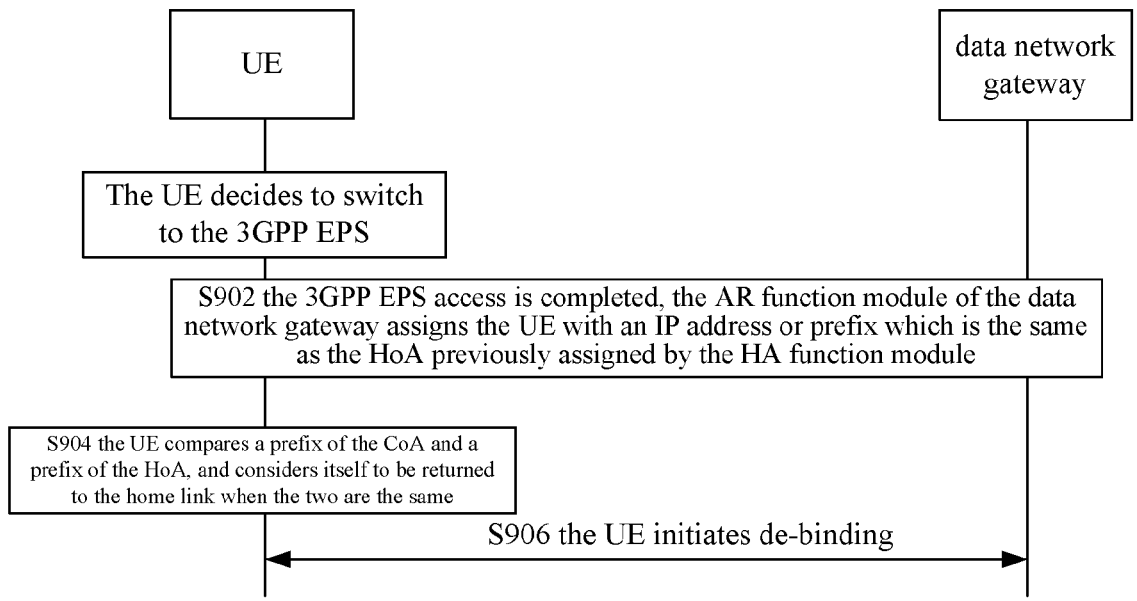
FIG. 9 is flow chart showing the sixth embodiment according to the present invention.

FIG. 9 is the flow chart showing the sixth embodiment of the present invention.

As shown in FIG. 9, the present embodiment illustrates that the UE switches from the foreign link to the EPS network, wherein the EPS network is the home link of the UE, and the P-GW has the functions of the AR and the HA, and the steps are described as follows:

S902, the UE accesses the EPS network, the AR function module of the P-GW searches, in the address assignment table, the IP address (or the prefix) assigned to the UE by the HA function module according to the identity information (IMSI) of the UE; if a corresponding item is found out, the AR function module takes the IP address (or a prefix) corresponding to the item as the CoA and sends it to the UE;

S904, the UE compares the prefix of the HoA stored when the UE accessed the foreign link before the switch with the prefix of the IP address (CoA) obtained from the AR function module, if they are the same, the UE is considered to be returned to the home link; and S906, the UE sends a de-binding update message to the HA, and after receiving the message, the HA dismisses the binding relationship between the HoA and the CoA of the UE.

Device Embodiment

According to an embodiment of the present invention, there is provided an apparatus for discovering a home link in mobile IP.

Figure 10:
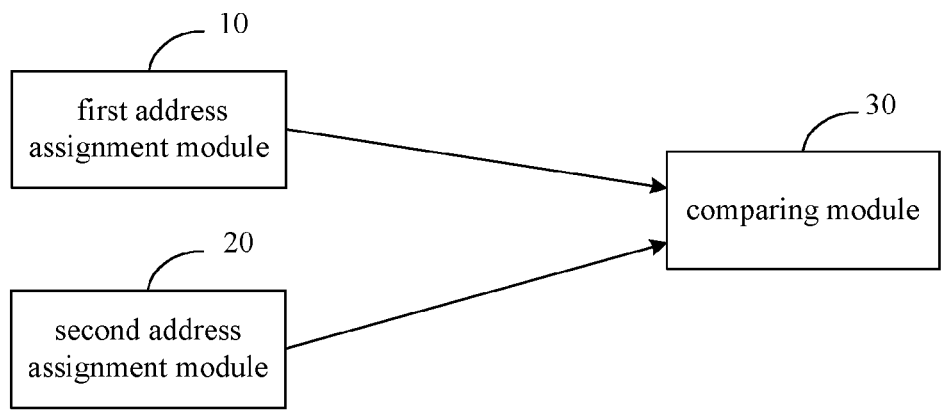
FIG. 10 is the block diagram showing the apparatus for discovering a home link in mobile IP according to the embodiment of the present invention.

FIG. 10 is the block diagram showing the apparatus for discovering a home link in mobile IP according to an embodiment of the present invention. As shown in FIG. 10, the apparatus comprises:

a first address assigning module 10, which is used to assign an IPv6 prefix associated with a specific access system of a UE to the UE; a second address assigning module 20, which is used to assign a HNP (Home Network Prefix) associated with a PDN (Packet Data Network) connection to the UE; a comparing module 30, respectively connected to the first address assigning module 10 and the second address assigning module 20, which is used to compare the two prefixes, and if the two prefixes match with each other, determine that the UE is on the home link.

In a particular realization process, the first address assignment module 10 may be set in the AR, the second address assignment module 20 may be set in the HA, moreover, the first address assignment module 10 and the second address assignment module 20 may be set in one module; the comparing module 30 may be set in the UE.

Based on above description, without pre-configuring the UE and the participation of the subscriber, a better application flexibility can be obtained through the method of the present invention.

Obviously, those skilled in the art shall understand that individual modules and steps of the present invention can be implemented with general computation devices integrated together or distributed in the network formed by a plurality of computation devices, alternatively implemented with program codes executable by computation devices, which can be stored in memory devices for execution by the computation devices, or implemented with ICs, or several modules or steps can be implemented with a single IC. Thus, the present invention is not limited to any particular hardware and software combination.

Above description is to illustrate the preferred embodiments not limit the present invention. Various alterations and changes to the present invention are apparent to those skilled in the art. The scope defined in claims shall comprise any modification, equivalent substitution and improvement in the spirit and principle of the present invention.

We claim:

1. A method for discovering a home link in mobile IP, comprising:

when a UE is attached to a network, an access network assigning an address as Care of Address (CoA) to the UE;

the UE acquiring a Home Address (HoA) from the network;

the UE comparing the CoA with the HoA, and determining that the UE is attached to the home link in the case that the CoA is the same as the HoA;

wherein during the UE obtains the home address from the network, the home address is sent to the UE by the access network or the home agent;

wherein the access network and the home agent share a same address space and use same identity information to identify the UE;

wherein in the case that any one of the access network and the home agent assigns an address to the UE, the method further comprises: inquiring whether the UE has been assigned with an address according to the identity information of the UE; in the case that it is inquired that the address has been assigned, the UE is assigned with the same address as the address that has been assigned;

wherein the method further comprises the following process after the access network assigns an address to the UE, the access network registering, in an address assignment table, the identity information of the UE, the address assigned to the UE and the association relationship between the identity information and the assigned address;

wherein the method further comprises: the home agent searching the address assigned to the UE in the address assignment table through the association relationship between the identity information of the UE and the assigned address; if the address corresponding to the identity information is searched out, the home agent regarding the searched address as a home address.

2. The discovering method according to claim 1, further comprising:

when the UE returns to the home link, in the case that the prefix information of a route notice message broadcasted on the home link is the same as the prefix information of the HoA of the UE, the UE considering that it returns to the home link and sending a binding update message to a home agent;

after receiving the binding update message, the home agent dismissing the binding relationship in the home agent between the CoA and the HoA.

3. The discovering method according to claim 1, wherein the access network comprises an access router.

4. The discovering method according to claim 3, wherein the access router and the home agent are set in one device.

5. An apparatus for discovering a home link in mobile IP, comprising:
- a first address assigning module, configured to assign an IPv6 prefix associated with a specific access system of a UE to the UE;
- a second address assigning module, configured to assign a HNP (Home Network Prefix) associated with a PDN (Packet Data Network) connection to the UE;
- a comparing module, configured to compare the two prefixes, and if the two prefixes match with each other, determine that the UE is on the home link;
- wherein during the UE obtains the HNP as a home address from the network, the HNP is sent to the UE by the access network or the home agent;
- wherein the access network and the home agent are configured to share a same address space and use same identity information to identify the UE;
- wherein in the case that any one of the access network and the home agent assigns an address to the UE, the any one of the access network and the home agent is configured to inquire whether the UE has been assigned with an address according to the identity information of the UE; in the case that it is inquired that the address has been assigned, the UE is assigned with the same address as the address that has been assigned;
- wherein after the access network assigns an address to the UE, the access network is configured to register, in an address assignment table, the identity information of the UE, the address assigned to the UE and the association relationship between the identity information and the assigned address;
- wherein the home agent is configured to search the address assigned to the UE in the address assignment table through the association relationship between the identity information of the UE and the assigned address; if the address corresponding to the identity information is searched out, the home agent is configured to regard the searched address as a home address.

* * * * *